(12) United States Patent
Grant et al.

(10) Patent No.: US 9,921,649 B2
(45) Date of Patent: Mar. 20, 2018

(54) ELECTROSTATIC HAPTIC BASED USER INPUT ELEMENTS

(71) Applicant: IMMERSION CORPORATION, San Jose, CA (US)

(72) Inventors: Danny A. Grant, Laval (CA); Daniel Gregory Parker, San Francisco, CA (US)

(73) Assignee: Immersion Corporation, San Jose, CA (US)

( * ) Notice: Subject to any disclaimer, the term of this patent is extended or adjusted under 35 U.S.C. 154(b) by 614 days.

(21) Appl. No.: 14/047,300

(22) Filed: Oct. 7, 2013

(65) Prior Publication Data

US 2015/0097800 A1   Apr. 9, 2015

(51) Int. Cl.
    *G09F 3/04*   (2006.01)
    *G06F 3/01*   (2006.01)
    *G06F 3/044*  (2006.01)

(52) U.S. Cl.
    CPC .............. *G06F 3/016* (2013.01); *G06F 3/044* (2013.01)

(58) Field of Classification Search
    CPC . G06F 2203/04101; G06F 2203/04105; G06F 3/044; G06F 3/0234; G06F 3/03547; G06F 3/03548; G06F 3/0414; H03K 17/962; G01D 5/24
    See application file for complete search history.

(56) References Cited

U.S. PATENT DOCUMENTS

| 2010/0171715 | A1  | 7/2010  | Peterson et al. |
| 2011/0227872 | A1* | 9/2011  | Huska et al. ................ 345/174 |
| 2012/0092263 | A1  | 4/2012  | Peterson et al. |
| 2012/0268386 | A1* | 10/2012 | Karamath et al. ............ 345/173 |
| 2012/0268412 | A1  | 10/2012 | Cruz-Hernandez et al. |
| 2012/0306790 | A1  | 12/2012 | Kyung et al. |

OTHER PUBLICATIONS

Extended European Search Report as issued in European Patent Application No. EP 14188015.3, dated Feb. 4, 2015.

* cited by examiner

*Primary Examiner* — William Boddie
*Assistant Examiner* — Jeffrey A Parker
(74) *Attorney, Agent, or Firm* — Kilpatrick Townsend & Stockton LLP

(57) ABSTRACT

A user input element includes a first part having a first capacitive surface, a second part having a second capacitive surface configured to be movable relative to the first capacitive surface, and an insulator positioned in between the first capacitive surface and the second capacitive surface so that a haptic effect is generated when the second capacitive surface is moved relative to the first capacitive surface from a first position to a second position. The user input element may be part of a haptic feedback interface system configured to provide haptic effects to a user operating the system.

21 Claims, 9 Drawing Sheets

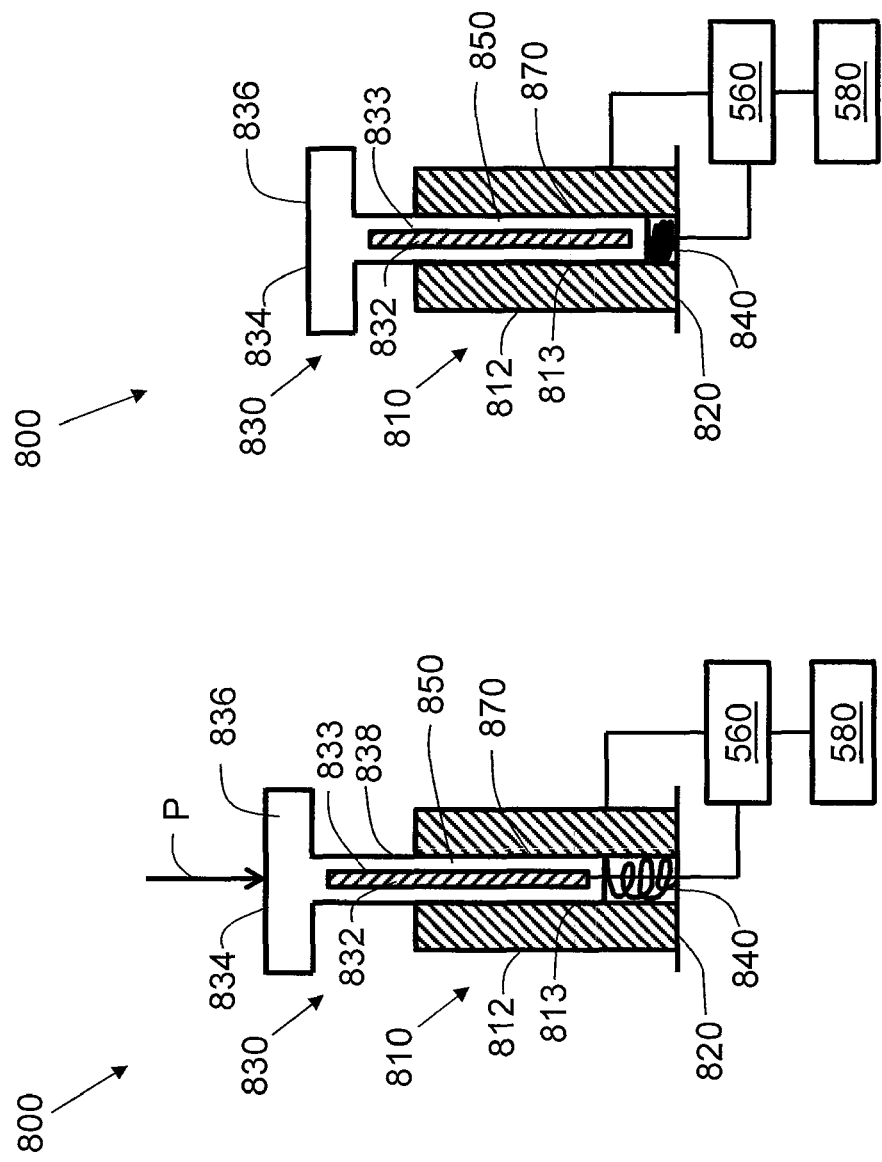

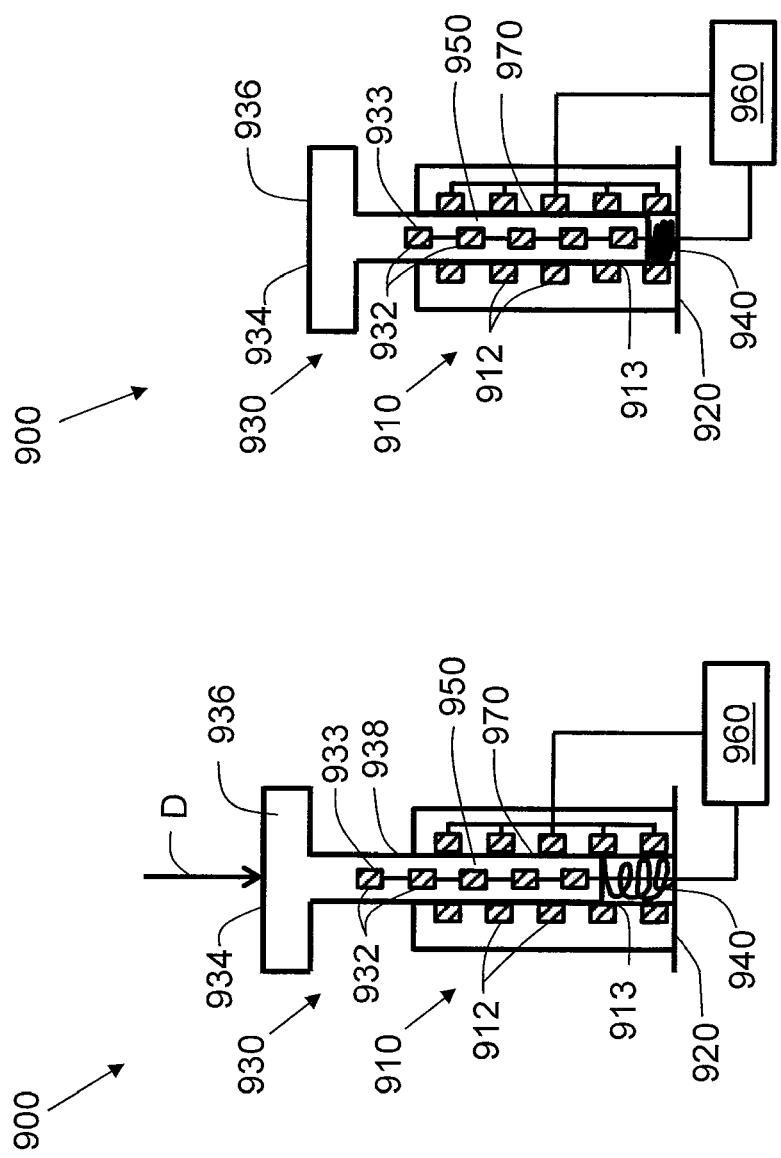

ELECTROSTATIC HAPTIC BASED USER INPUT ELEMENTS

FIELD

The present invention is directed to electrostatic haptic based user input elements and haptic feedback interface systems that include such elements.

BACKGROUND

One challenge with the creation of kinesthetic-type haptic effects for user input elements such as joysticks, triggers, buttons, mouse wheels and keyboard keys, is in the volume taken up by the actuators that are used to create such haptic effects. It is desirable to develop such user input elements that allow for kinesthetic-like haptic effects, such as detents, in a reduced volume form factor that make the user input elements amenable to the space constraints found in mobile peripherals and other haptic feedback interface systems.

SUMMARY

According to an aspect of the present invention, there is provided a user input element that includes a first part having a first capacitive surface, a second part having a second capacitive surface configured to be movable relative to the first capacitive surface, and an insulator positioned in between the first capacitive surface and the second capacitive surface so that an electrostatic haptic effect is generated when the second capacitive surface is moved relative to the first capacitive surface from a first position to a second position.

In an embodiment of the user input element, the first part includes a first electrode that defines the first capacitive surface, and the second part includes a second electrode that defines the second capacitive surface.

In an embodiment of the user input element a voltage difference is applied to the first electrode and the second electrode by a voltage generator to generate the first capacitive surface and the second capacitive surface.

In an embodiment of the user input element, the first part includes the insulator and the insulator covers the first electrode.

In an embodiment of the user input element, the second part includes the insulator and the insulator covers the second electrode.

In an embodiment of the user input element, the first electrode is fixed in position.

In an embodiment of the user input element, the user input element also includes a resilient element configured to bias the second capacitive surface in the first position.

In an embodiment of the user input element, the first part includes a plurality of first electrodes defining the first capacitive surface and the second part comprises a plurality of second electrodes defining the second capacitive surface.

In an embodiment of the user input element, the electrostatic haptic effect is generated when a voltage is applied to the plurality of first electrodes and the plurality of second electrodes by a voltage generator to generate the first capacitive surface and the second capacitive surface.

In an embodiment of the user input element, the user input element is a key of a keyboard.

In an embodiment of the user input element, the user input element is a button of a mouse.

In an embodiment of the user input element, the user input element is a joystick.

In an embodiment of the user input element, the user input element is a button, a trigger, or a joystick on a gaming peripheral.

According to an aspect of the present invention, there is provided a haptic feedback interface system configured to provide haptic effects to a user operating the system. The system includes a computer comprising a processor, a display configured to display images output from the computer, and a user element configured to manipulate an object displayed on the display or an object to be displayed on the display. The user element includes a first part having a first capacitive surface, a second part having a second capacitive surface configured to be movable relative to the first capacitive surface, and an insulator positioned in between the first capacitive surface and the second capacitive surface so that an electrostatic haptic effect is generated when the second capacitive surface is moved relative to the first capacitive surface from a first position to a second position.

In an embodiment of the haptic feedback interface system, the system also includes a keyboard operatively connected to the computer, and the user input element is a key of the keyboard.

In an embodiment of the haptic feedback interface system, the system also includes a user input device operatively connected to the computer, and the user input element is a button of the user input device.

In an embodiment of the haptic feedback interface system, the user input device is a computer mouse.

In an embodiment of the haptic feedback interface system, the system is a gaming system and the user input element is a joystick operatively connected to the computer.

In an embodiment of the haptic feedback interface system, the system also includes a gaming peripheral operatively connected to the computer, and the user input element is a button, a trigger, or a joystick on the gaming peripheral.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

FIGS. 8A and 8B schematically illustrate a cross-section of an electrostatic haptic based user input element of the systems of FIGS. 1-3 in accordance with an embodiment of the invention; and FIGS. 9A and 9B schematically illustrate a cross-section of an electrostatic haptic based user input element of the systems of FIGS. 1-3 in accordance with an embodiment of the invention.

DETAILED DESCRIPTION

Figure 1:
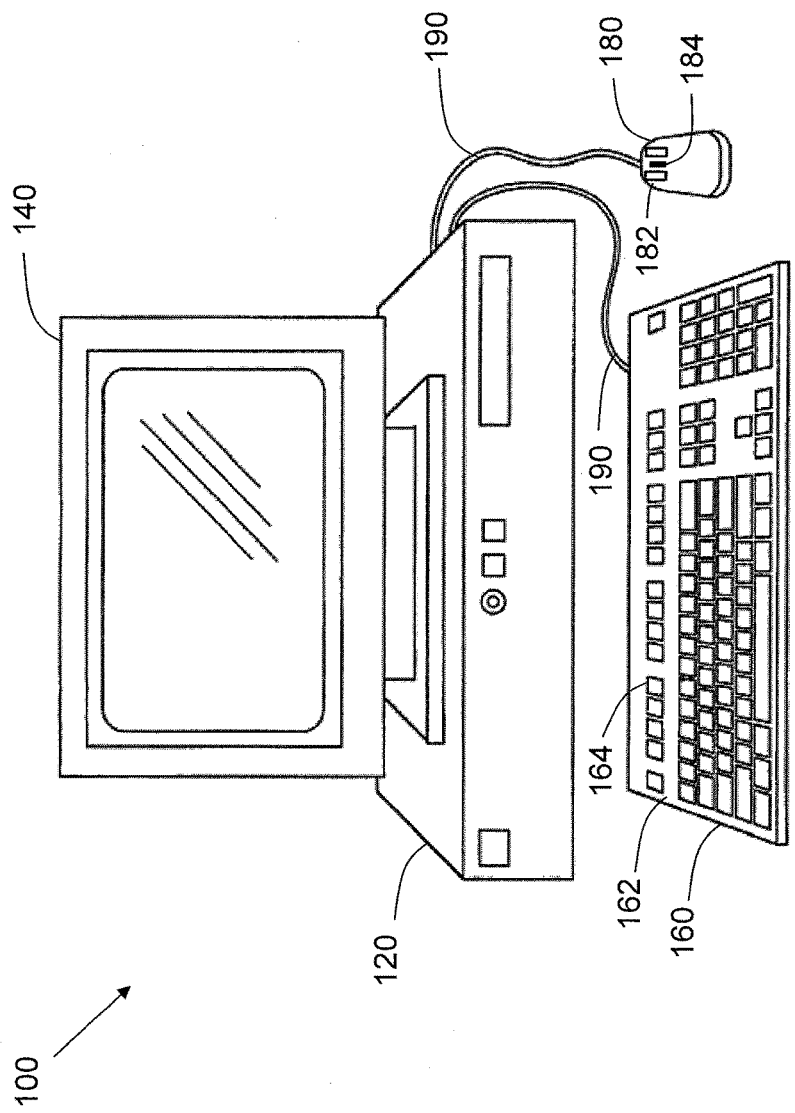
FIG. 1 illustrates a haptic feedback interface system in accordance with embodiments of the invention.

FIG. 1 illustrates a haptic feedback interface system 100 according to embodiments of the present invention. As illustrated, the system 100 includes a host computer 120, a display 140, a keyboard 160, and a computer mouse 180. The system 100 is configured to allow a user to provide input to the host computer 120 based on the user's manipulation of the keyboard 160 and/or the mouse 180. In accordance with embodiments of the invention, the system 100 is further configured to provide haptic feedback to the user in response to the user's manipulation of the keyboard 160 and/or the mouse 180, as described in further detail below.

The keyboard 160 includes a housing 162 and a plurality of user input elements in the form of keys 164 or buttons. The user may provide input to the computer 120 by pressing the keys 164 of the keyboard 160, as is well known. As used herein, "pressing" a key 164 means any action including physically contacting a predefined key or area to provide an input signal to the computer 120 or other controller, and may include physically moving a key 164 from a rest position to a depressed position, contacting a predefined area that senses user contact, etc. The keyboard 160 may be a full-sized keyboard with over 100 keys, as illustrated in FIG. 1, or a smaller version, such as the type of keyboard that is used in a portable haptic feedback interface system 200 illustrated in FIG. 2. Other keyboards, such as numeric keyboards, portable keyboards, keyboards on smartphones and personal digital assistants (PDA's), etc., may be enabled with aspects of the present invention in accordance with embodiments described herein.

The keyboard 160 is coupled to the computer 120 by a bus 190, which communicates signals between the keyboard 160 and the computer 120 and also provides power to the keyboard 160. The bus 190 may be, for example, a USB or Firewire bus when there is a physical connection between the keyboard 160 and the computer 120. In an embodiment, the keyboard 160 may be coupled to the computer 120 through a wireless bus so that signals can be sent between the keyboard 160 and the computer 120 by wireless transmission/reception of electromagnetic energy (infrared, radio frequency (RF), etc.) or other types of signals. In embodiments in which the keyboard is a "wireless" keyboard, the power for the keyboard 160 may be supplied by a power storage device, such as a battery attached to or located within the keyboard 160.

Figure 2:
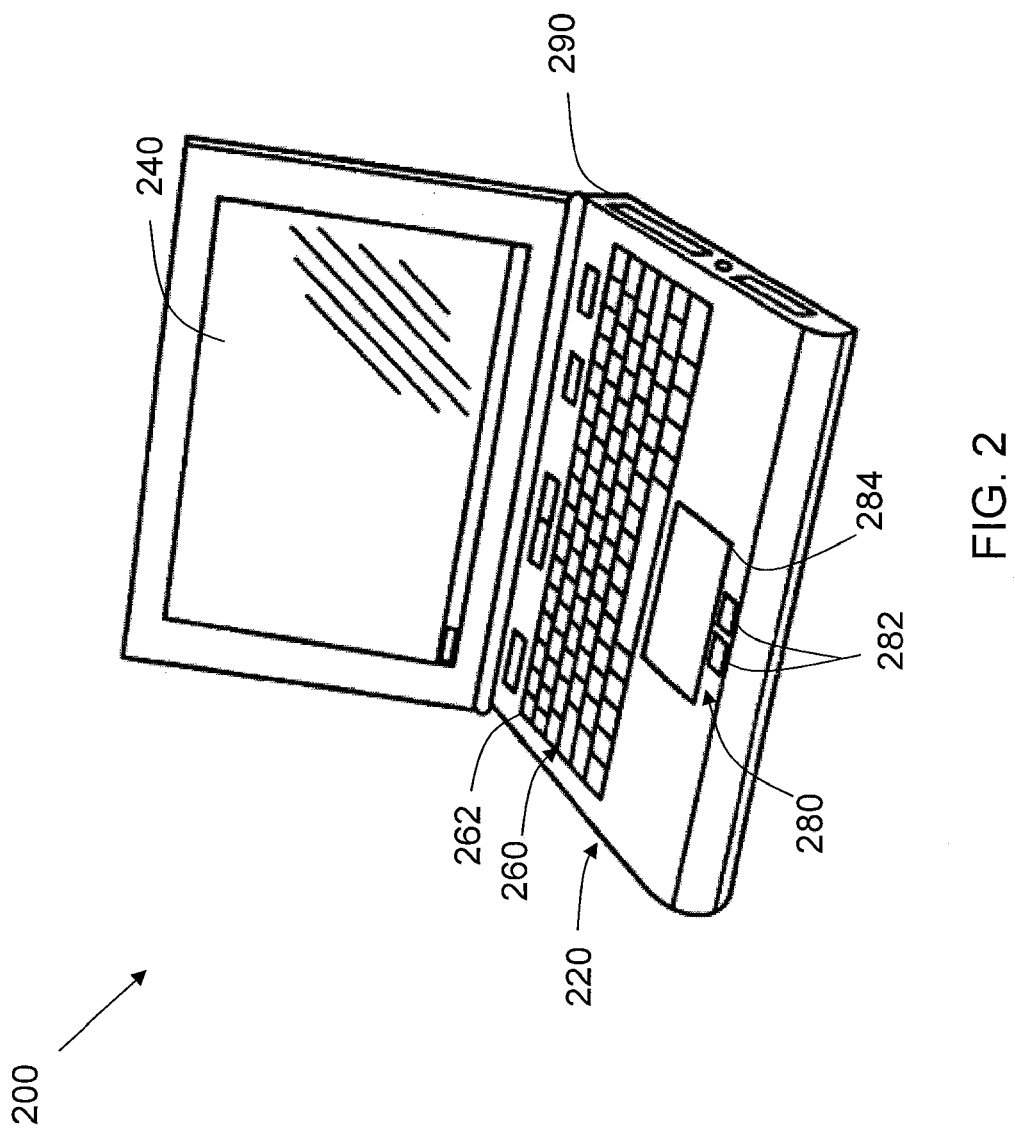
FIG. 2 illustrates a haptic feedback interface system in accordance with embodiments of the invention.

The computer 120 may be a personal computer or workstation, as illustrated in FIG. 1, or a laptop computer, as illustrated in FIG. 2 and discussed in further detail below. The computer 120 may include a host microprocessor, random access memory (RAM), read only memory (ROM), input/output (I/O) circuitry, and other components of computers well-known to those skilled in the art, and is configured to implement one or more host application programs with which a user is interacting via the keyboard 160 and other peripherals, such as the mouse 180, if appropriate, and which may include haptic feedback functionality. For example, a host application program may be a video game, word processor or spreadsheet, email program, Web page or browser that implements HTML or VRML instructions, scientific analysis program, virtual reality training program or application, or other application program that utilizes input of the keyboard 160.

The display 140 may be operatively connected to the computer 120 by known methods and may be a standard display screen or any other visual output device. Typically, applications being executed by the computer 120 provide images to be displayed on the display 140 and/or other feedback, such as auditory signals that may be output by a speaker or speakers integrated with the display 140 or operatively connected to the computer 120, but separate from the display 140.

Other peripheral devices, such as the mouse 180, may also be connected to the computer 120 via a bus 190, as described above. The mouse 180 may be manipulated by the user in two planar dimensions to control a cursor or other control in a displayed computer environment or provide other input. In one common arrangement, the user manipulates both the mouse 180 and the keyboard 160 to provide input to a word processor, spreadsheet, or similar program running on the computer 120. In some embodiments, the mouse 180 may be configured to provide haptic feedback to the user when the user presses a user input element in the form of a button 182 provided on the mouse 180, or when the user operates a wheel 184 provided on the mouse 180, as discussed in further detail below.

The portable haptic feedback interface system 200 illustrated in FIG. 2 includes a host computer 220, a display 240, a keyboard 260 that includes a plurality of user input elements in the form of keys 262 or buttons, and a user input device 280, all of which are contained in or supported by a portable housing 290. The functions of the computer 220, the display 240, and the keyboard 260 are the same as the computer 120, the display 140, and the keyboard 160, respectively, described above. The user input device 280, as illustrated, includes a pair of buttons 282 and a touchpad 284 that are configured to allow the user to provide input to the system 200 by moving a cursor displayed by the display 240 by interacting with the touchpad 284 and selecting items displayed by the display 240 or executing commands with by pressing one of the buttons 282. As discussed in further detail below, haptic feedback may be provided to the user via the keys 262 of the keyboard and/or the buttons 282 of the user input device 280 in accordance with embodiments of the invention.

Figure 3:
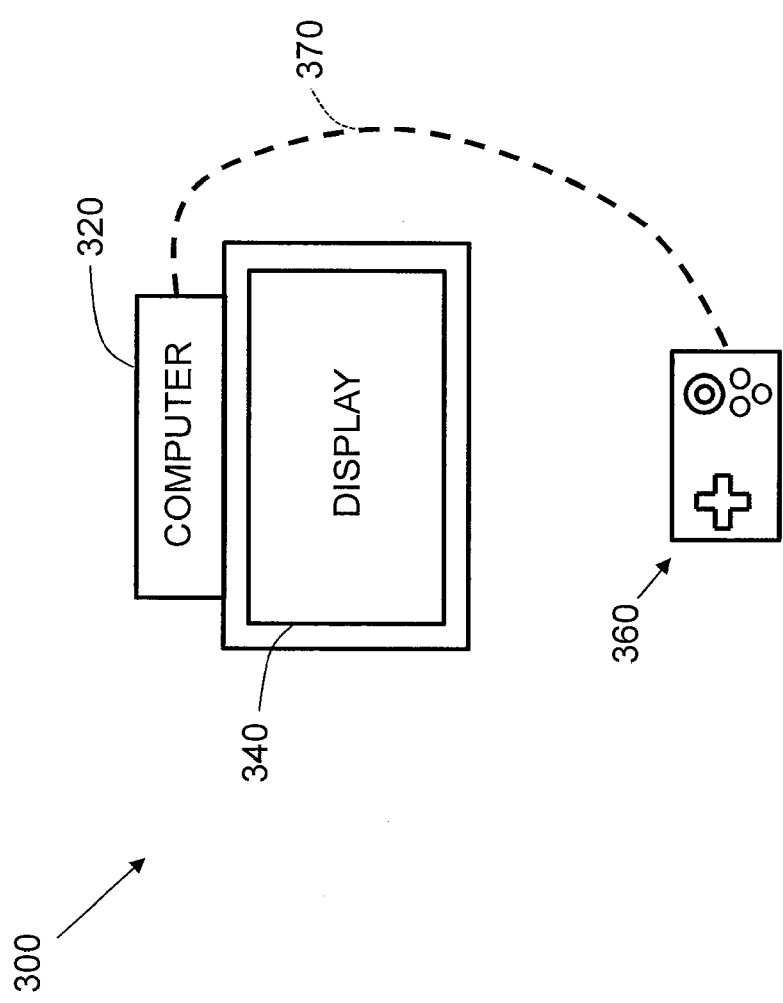
FIG. 3 illustrates a haptic feedback interface system in accordance with embodiments of the invention.

FIG. 3 illustrates a haptic feedback interface system 300 that includes a computer 320, a display 340, and a user input device 360 that is operatively connected to the computer 320 via a bus 370. The computer 320 may be one of a variety of home video game console systems commonly connected to a television set or other display, such as systems available from Sony, Microsoft, Nintendo, etc. In other embodiments, the computer 320 may be a "set top box" that can be used, for example, to provide interactive television functions to users, a "network-" or "internet-computer" that allows users to interact with a local or global network using standard connections and protocols such as used for the Internet and World Wide Web, or another electronic appliance or device that is configured to allow the user to provide input for selection or control.

Figure 4:
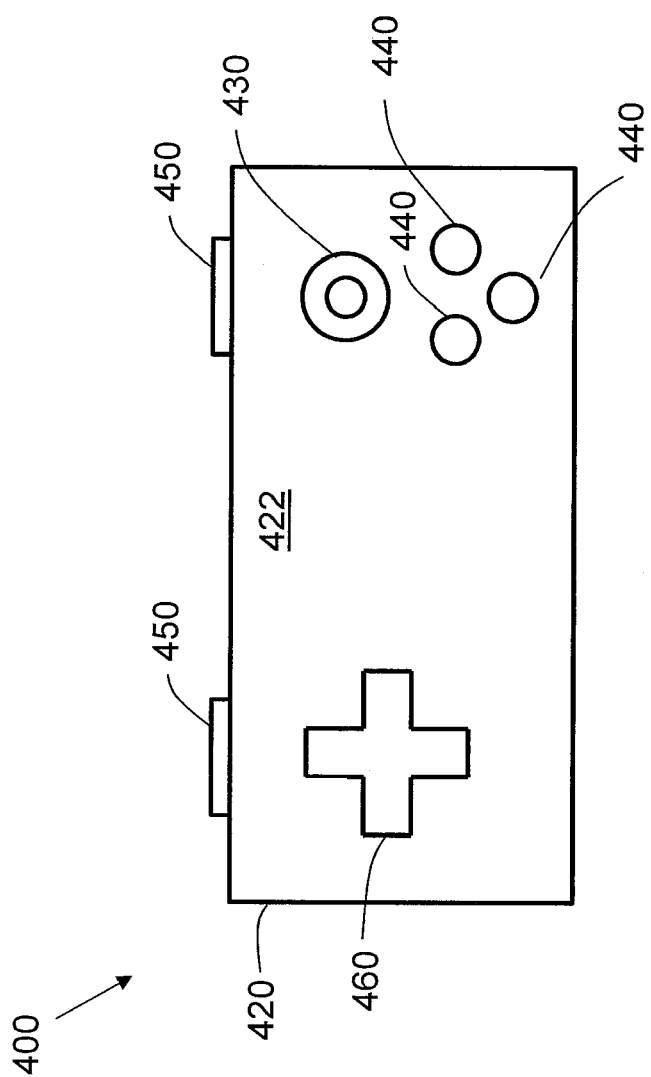
FIG. 4 illustrates a more detailed view of an embodiment of a gaming peripheral of the haptic feedback system of FIG. 3.

In the illustrated embodiment, the user input device 360 is a gaming peripheral 400, which is illustrated in greater detail in FIG. 4. The gaming peripheral 400, which may be in the form of a game pad, includes a housing 420 that supports a plurality of user input elements, including a joystick 430, a plurality of buttons 440, a pair of triggers 450, and a D-pad 460. More or less user input elements than illustrated in FIG. 4 may be included in the gaming peripheral 400. The illustrated embodiment is not intended to be limiting in any way. The user input elements 430, 440, 450, 460 of the gaming peripheral 400 allow a user of the system 300 of, for example, FIG. 3 to interact with a computer game being executed by the computer 320 and displayed by the display 340. The functionality of each of the elements 430, 440, 450, 460 in terms of providing input to the game may change depending on the game being played by the user, as is known in the art.

Figure 5:
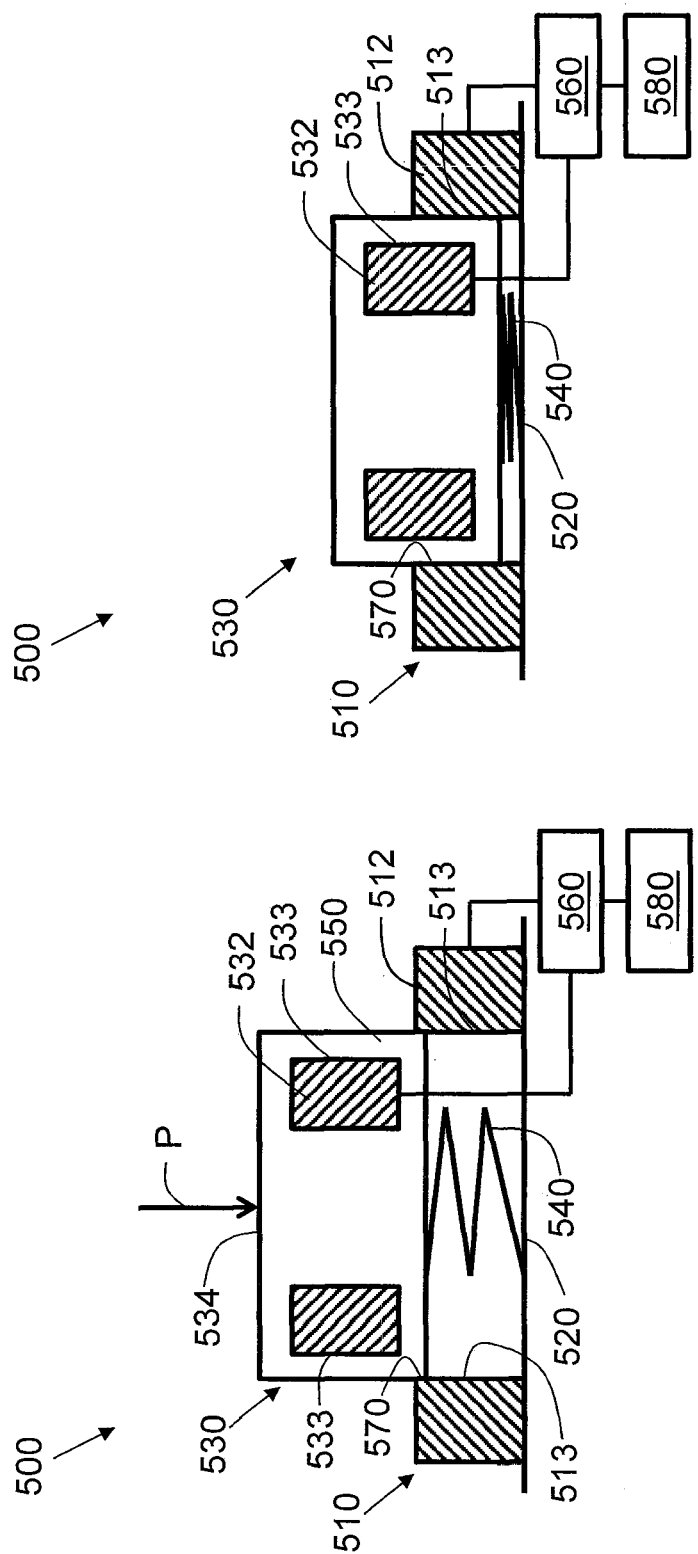
FIGS. 5A and 5B schematically illustrate a cross-section of an electrostatic haptic based user input element of the systems of FIGS. 1-3 in accordance with an embodiment of the invention.

FIGS. 5A and 5B illustrate a cross-section of a user input element 500 in accordance with an embodiment of the invention. The user input element 500 may be one of the keys 162 of the keyboard 160 of the system 100 of FIG. 1, one of the keys 262 of the keyboard 260 of the system 200 of FIG. 2, or one of the user input elements of the gaming peripheral 400 of FIG. 4, such as one of the buttons 440, one of the triggers 450, or the D-pad 460.

As illustrated in FIG. 5A, the user input element 500 includes a first part 510 connected to a base 520 and a second part 530 configured to be movable relative to the base 520 and the first part 510. The first part 510 is configured to partially surround or completely surround a periphery of the second part 530. The user input element 500 also includes a resilient element 540 disposed between the base 520 and the second part 530. The resilient element 540, which may be a spring or a damper, is configured to bias the second part 530 in a first position, which may be referred to as a rest position, illustrated in FIG. 5A, when no external forces are applied to the second part 530.

The first part 510 includes a first electrode 512 defining a first capacitive surface 513 and the second part 530 includes a second electrode 532 defining a second capacitive surface 533. In the embodiment illustrated in FIGS. 5A and 5B, the user input element 500 also includes an insulator 550 that surrounds the second electrode 532 so that the first electrode 512 and the second electrode 532 do not physically come into contact with each other. The first electrode 512 and the second electrode 532 may be made from any suitable conductive material, such as copper, aluminum, gold, or silver, any suitable semiconductor material, or any other conductive material that is suitable to provide the first and second capacitive surfaces 513, 533 upon application of a voltage differential provided to the first and second electrodes 512, 532. The insulator 550 may be made from any suitable insulating material, such polymer, plastic, glass, or any other insulating material.

The second part 530 includes a top surface 534 that is configured to be engaged by a digit of a user's hand so that the user may press down on the top surface 534 and move the second part 530 downward (as indicated by arrow P in FIG. 5A) from the first position and against the bias provided by the resilient member 540 to a second position, which may be referred to as the actuated position, illustrated in FIG. 5B, to actuate the user input element 500. Although the orientation of the user input element 500 is shown in FIGS. 5A and 5B is such that movement of the second part 530 is up and down, embodiments of the invention are not limited to such an orientation. For example when the user input element 500 is implemented as one of the triggers 450 of the gaming peripheral 400 illustrated by FIG. 4, the movement of the second part 530 is generally sideways when the gaming peripheral 400 is oriented with a top surface 412 of the housing 410 pointed upward. The illustrated orientation of the user input element 500 is not intended to be limiting in any way.

The user input element 500 is configured to generate an electrostatic haptic effect when the top surface 534 of the second part 530 is pressed by the user and an electric signal, such as voltage, is generated by a haptic drive circuit 560 and applied to the first electrode 512 and the second electrodes 532 to create the first and second capacitive surfaces 513, 533. More specifically, the electrostatic haptic effect may be created when operating the user input element 500 by applying a voltage difference to the first electrode 512 and the second electrode 532, which changes the attractive force between the first and second electrodes 512, 532, which changes the friction force between the contacting surfaces of the first part 510 and the second part 530 at an interface 570. The voltage difference may be generated by a high-voltage amplifier that is included in the haptic drive circuit 560. By creating a short transient voltage change, for example a 20 ms square wave, with the haptic drive circuit 560, a momentary friction force increase may be created at the interface 570 and the user may experience a slight resistance, which may feel like a typical button detent (click) as the user moves the second part 530 from the rest position illustrated by FIG. 5A to the actuated position illustrated in FIG. 5B.

In an embodiment, such an effect may be varied in profile by the haptic drive circuit 560 to give different types of haptic sensations to the user. For example, if the position of the second part 530 relative to the first part 510 is being measured, the detent (i.e. haptic effect) can be placed at different positions as the second part 530 is moved so that a feeling of multiple stages may be created. Continuous haptic effects (for example, periodics) may also be created when the second part 530 is moving relative to the first part 510 to give different texture sensations by providing different voltage signals to the first and second electrodes 512, 532.

A processor 580 in signal communication with the haptic drive circuit 560 may be programmed to provide instructions to the haptic drive circuit 560 so that the haptic drive circuit 560 generates the appropriate voltage signal to provide the desired haptic effect. The instructions may be based on an application being run on one of the computers 120, 220, 320 of the systems 100, 200, 300 described above, or may be already pre-programmed into the processor 580. The processor 580 may be part of any one of the computers 120, 220, 320 of the systems 100, 200, 300 described above, or may be a separate device. Similarly, the haptic drive circuit 560 may be part of or separate from the processor 580 and may be part of or separate from any one of the computers 120, 220, 320 of the systems 100, 200, 300 described above. In an embodiment, the haptic drive circuit 560 and/or the processor 580 may be part of the user input element 500.

In an embodiment in which the user input element 500 is a haptic trigger in a first person shooter game being played on, for example, the system 300 illustrated in FIG. 3, different weapons used in the game may have different sensations when fired. For example, a musket may have a rough feel that may be provided by the electrostatic haptic effect, while a laser may have a high frequency feel that may be provided by the electrostatic haptic effect by altering the voltage being applied to the first and second electrodes 512, 532 by the haptic drive circuit 560.

In an embodiment, the user input element may be used to move an object in a game being played on any of the haptic feedback interface systems 100, 200, 300 described above and the voltage difference applied to the first and second electrodes may correspond to the position of the object in a game in order to provide a haptic effect based on an interaction of the object with its surroundings or another object within the game. For example, the game may be chess and the object may be a chess piece. When the user uses the user input device that includes a user input element described herein, a detent may be felt by the user when the chess piece is moved from one square to another square.

Figure 6:
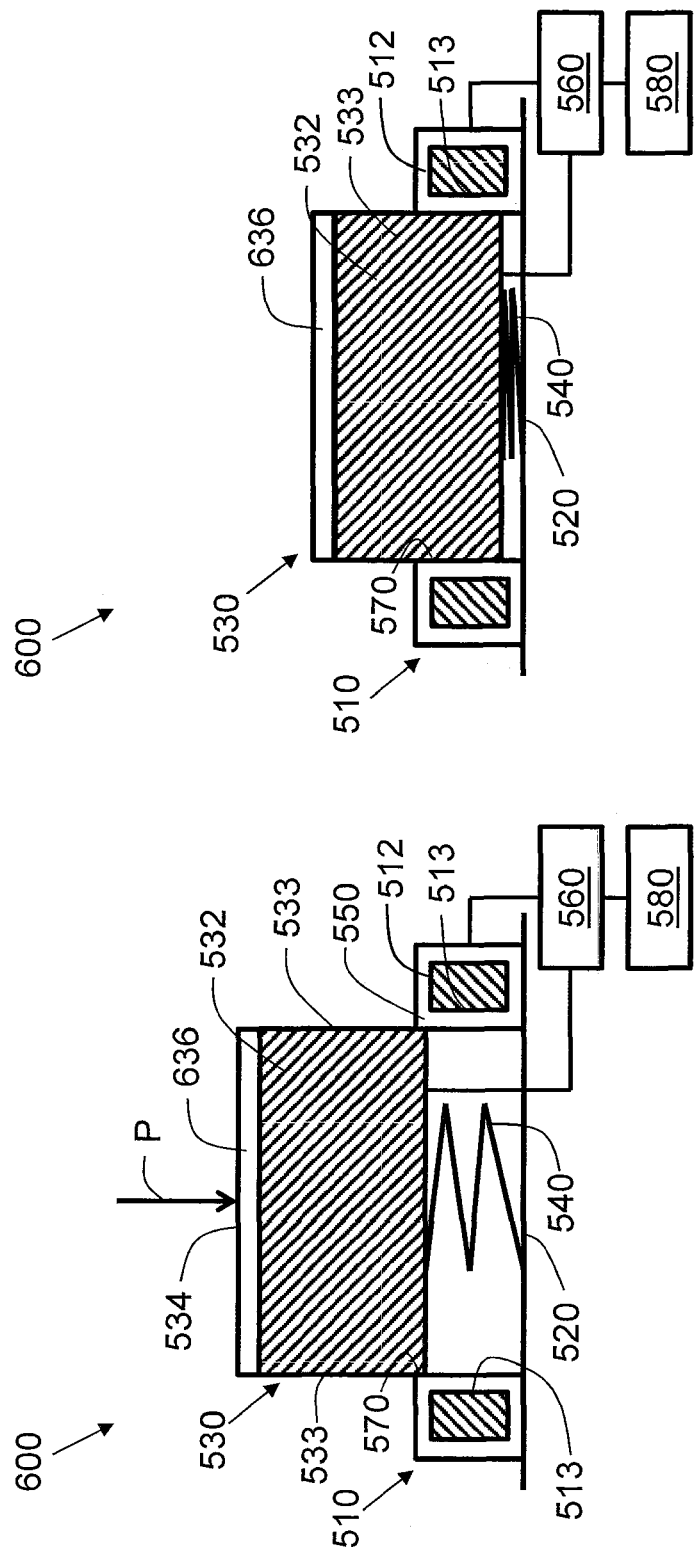
FIGS. 6A and 6B schematically illustrate a cross-section of an electrostatic haptic user input element of the systems of FIGS. 1-3 in accordance with an embodiment of the invention.

FIGS. 6A and 6B illustrate a user input element 600 in accordance with an embodiment of the invention. The user input element 600 is similar to the user input element 500 described above with respect to FIGS. 5A and 5B, with the exception of the insulator 550 being part of the first part 510 instead of the second part 530, and surrounding the first electrode 512 instead of the second electrode 532. In addition, a second insulator 636 may be provided on top of the second electrode 530 to provide the top surface 534 so that the user's digit does not contact the second electrode 530. Otherwise, the user input element 600 operates in the same manner as described above with respect to the user input element 500.

Figure 7:
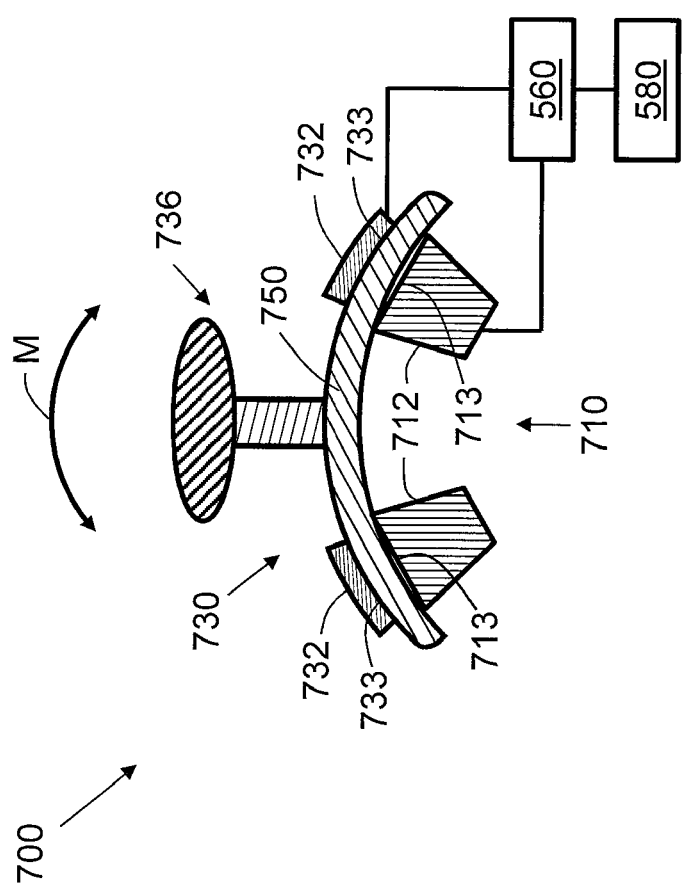
FIG. 7 schematically illustrates a cross-section of an electrostatic haptic based user input element of the systems of FIGS. 1-3 in accordance with an embodiment of the invention.

FIG. 7 illustrates an implementation of the present invention as applied to a user input element 700 in the form of a joystick. As illustrated therein, the user input element 700 includes a first part 710 that includes a pair of first electrodes 712 and a second part 730 that includes a pair of second electrodes 732. An insulator 740 is positioned between the first electrodes 712 and the second electrodes 732. Although the insulator 740 is illustrated as being part of the second part 730, which is configured to be movable relative to the first part 710, in another embodiment, the insulator 740 may be part of the first part 710, which is fixed. The illustrated embodiment is not intended to be limiting in any way. Similar to the embodiment described above with respect to FIGS. 5A and 5B, the haptic drive circuit 560 is connected to the first electrodes 712 and the second electrodes 732 to generate first and second capacitive surfaces 713, 733, respectively, so that the electrostatic haptic effect in accordance with embodiments of the invention described above may be generated upon movement of the second part 730 relative to the first part 710, as indicated by double arrow M in FIG. 7. A user may engage a handle 736 of the second part 730, which may be connected to or part of the insulator 740, and pivot the handle 736 in a known manner to effect a movement of an object being displayed on, for example the display 340 of the system 300 of FIG. 3 when the user input element 700 is being used as the gaming peripheral 360. More or less electrodes 712, 732 may be used in the user input element 700 than those illustrated in FIG. 7. The illustrated embodiment is not intended to be limiting in any way.

FIGS. 8A and 8B illustrate another implementation of the present invention as applied to a user input element 800 in the form of a button. As illustrated in FIG. 8A, the user input element 800 includes a first part 810 connected to a base 820 and a second part 830 configured to be movable relative to the base 820 and the first part 810. The first part 810 is configured to partially surround or completely surround a periphery of a portion of the second part 830. The user input element 800 also includes a resilient element 840 disposed between the base 820 and the second part 830. The resilient element 840 is configured to bias the second part 830 in a first position, which may be referred to as a rest position, illustrated in FIG. 8A, when no external forces are applied to the second part 830.

The first part 810 includes a first electrode 812 defining a first capacitive surface 813 and the second part 830 includes a second electrode 832 defining a second capacitive surface 833. In the embodiment illustrated in FIGS. 8A and 8B, the user input element 800 also includes an insulator 850 that surrounds the second electrode 832 so that the first electrode 812 and the second electrode 832 do not physically come into contact with each other.

The second part 830 includes a top surface 834 provided by a top portion 836 that is configured to be engaged by a digit of a user's hand so that the user may press down on the top surface 837 and move the second part 830 downward (as indicated by arrow P in FIG. 8A) from the first position and against the bias provided by the resilient member 840 to a second position, which may be referred to as the actuated position, illustrated in FIG. 8B to actuate the user input element 800. The top portion 836 is connected to a shaft or narrow portion 838 that is disposed inside of the first part 810.

The user input element 800 is configured to generate an electrostatic haptic effect when the top surface 834 of the second part 830 is pressed by the user and an electric signal, such as voltage, is generated by a haptic drive circuit 560 and applied to the first electrode 812 and the second electrode 832 to create the first and second capacitive surfaces 813, 833.

The user input element 800 is substantially the same as the user input element 500 described above, with the exception of the shapes of the first part 810 and the second part 830. For example, the first part 810 and the first electrode 812 are more elongated than the first part 510 and the first electrode 512 illustrated in FIG. 5A, and provide a greater surface area for the first capacitive surface 813 as compared to the first capacitive surface 513 in FIG. 5A. Similarly, the second part 830 and the second electrode 832 are more elongated than the second part 530 and the second electrode 532 in FIG. 5A, and provide a greater surface area for the second capacitive surface 833 as compared to the second capacitive surface 533 in FIG. 5A. Such an arrangement provides a longer interface 870 as compared to the interface 570 of FIG. 5A, which may allow for different electrostatic haptic effects to be generated.

Operation of the user input element 800 is the same as the user input element of FIGS. 5A and 5B. The user may engage the top surface 834 of the second part 830 of the user input element 800 while the haptic drive circuit 560 provides voltage signals to the first and second electrodes 812, 832 and press the top surface 834 downward, as indicated by arrow P. The combination of the movement of the second capacitive surface 833 relative to the first capacitive surface 813 and the applied dynamic voltage signals to the first and second electrodes 812, 832 create the electrostatic effect that the user may feel as the second part 830 is moving.

As can be appreciated by one of skill in the art, the size and configuration of the first parts and the second parts of the user input elements in accordance with embodiments of the invention may be varied to provide different functionalities and haptic effects. The illustrated embodiments are not intended to be limiting in any way and are merely provided as examples of implementations of the invention. For example, the portion of the user input element that is engaged by the user may be a deformable object configured to be pressed or squeezed by the user. In an embodiment, the first and second electrodes may be embedded in a handle of a user input device and configured so that the user may squeeze the handle in and out as inputs and receive an electrostatic haptic effect as outputs.

FIGS. 9A and 9B illustrate another implementation of the present invention as applied to a user input element 900 in the form of a trigger or a button. As illustrated in FIG. 9A, the user input element 900 includes a first part 910 connected to a base 920 and a second part 930 configured to be movable relative to the base 920 and the first part 910. The first part 910 is configured to partially surround or completely surround a periphery of a portion of the second part 930. The user input element 900 also includes a resilient element 940 disposed between the base 920 and the second part 930. The resilient element 940 is configured to bias the second part 930 in a first position, which may be referred to as a rest position, illustrated in FIG. 9A, when no external forces are applied to the second part 930.

The first part 910 includes a plurality of first electrodes 912, each of which having a capacitive surface to collectively define a first capacitive surface 913 and the second part 930 includes a plurality of second electrodes 932, each of which having a capacitive surface to collectively define a second capacitive surface 933. In the embodiment illustrated in FIGS. 9A and 9B, the user input element 900 also includes an insulator 950 that surrounds the plurality of second electrodes 932 so that the plurality of first electrodes 912 and the plurality of second electrodes 932 do not physically come into contact with each other.

The second part 930 includes a top surface 934 provided by a top portion 936 that is configured to be engaged by a digit of a user's hand so that the user may press down on the top surface 937 and move the second part 930 downward (as indicated by arrow D in FIG. 9A) from the first position and against the bias provided by the resilient member 940 to a second position, which may be referred to as the actuated position, illustrated in FIG. 9B to actuate the user input element 900. The top portion 936 is connected to a shaft or narrow portion 938 that is disposed inside of the first part 910.

The user input element 900 is configured to generate an electrostatic haptic effect when the top surface 934 of the second part 930 is pressed by the user and an electric signal, such as voltage, is generated by a haptic drive circuit 960 and applied to the plurality of first electrodes 912 and the plurality of second electrodes 932 to create the first and second capacitive surfaces 913, 933.

In operation, the user may engage the top surface 934 of the second part 930 of the user input element 900 while the haptic drive circuit 960 provides a voltage signal to the plurality of first electrodes 912 and the plurality of second electrodes 932 and press the top surface 934 downward, as indicated by arrow D. The combination of the movement of the second capacitive surface 933 relative to the first capacitive surface 913 and the applied voltage signal, which may be a constant voltage signal, to the plurality of first electrodes 912 and the plurality of second electrodes 932 create the electrostatic effect that the user may feel as the second part 930 is moving. The electrostatic effect may feel like detents or double clicks to the user. If no voltage is applied to the plurality of first electrodes 912 and the plurality of second electrodes 932, movement of the second part 930 relative to the first part 910 may feel smooth because no electrostatic effect is generated. More or less electrodes 912, 932 than the number illustrated may be used. The illustrated embodiment is not intended to be limiting in any way.

The embodiment illustrated in FIGS. 9A and 9B may be used to create a non-programmable set of detents or areas where friction between the second part 930 and the first part 910 of the user input element changes, instead of using a programmable capacitive electrode as described above with respect to FIGS. 5A-8B. For example, the user input element 900 illustrated in FIGS. 9A and 9B may be a trigger and be powered on for a trigger haptic effect or off for smooth operation with no haptic effect. The plurality of electrodes may be used to provide double clicks in such an implementation.

Embodiments of the invention provide for programmable haptic kinesthetic-like effects in a reduced space, which may allow for more compact actuation for a user input element that provides haptic effects to the user, which is desired for low profile keyboards and gamepads. Embodiments of the invention may be implemented on other user interface devices, in addition to the user input and interface devices described herein. For example, user input elements described herein may be implemented on mobile phones, user interface devices in vehicles, medical procedure simulation systems, etc.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A user input element, comprising:
   a first part comprising a first electrode defining a first capacitive surface;
   a second part comprising a second electrode defining a second capacitive surface configured to be movable relative to the first capacitive surface, the second part in contact with the first part at an interface; and
   an insulator positioned in between the first capacitive surface and the second capacitive surface so that an electrostatic haptic effect is generated when the second capacitive surface is moved relative to the first capacitive surface from a first position to a second position, wherein a voltage difference is applied to the first electrode and the second electrode by a voltage generator to generate the first capacitive surface and the second capacitive surface and to change a friction force between the first part and the second part at the interface and generate the electrostatic haptic effect.

2. The user input element of claim 1, wherein the first part comprises the insulator and the insulator covers the first electrode.

3. The user input element of claim 1, wherein the second part comprises the insulator and the insulator covers the second electrode.

4. The user input element of claim 1, wherein the first electrode is fixed in position.

5. The user input element of claim 1, wherein the first part comprises a plurality of first electrodes defining the first capacitive surface and the second part comprises a plurality of second electrodes defining the second capacitive surface.

6. The user input element of claim 5, wherein the electrostatic haptic effect is generated when the voltage difference is applied to the plurality of first electrodes and the plurality of second electrodes by the voltage generator.

7. The user input element of claim 1, further comprising a resilient element configured to bias the second capacitive surface in the first position.

8. The user input element of claim 1, wherein the user input element is a key of a keyboard.

9. The user input element of claim 1, wherein the user input element is a button of a user input device.

10. The user input element of claim 9, wherein the user input device is a computer mouse.

11. The user input element of claim 1, wherein the user input element is a joystick.

12. The user input element of claim 1, wherein the user input element is a button, a trigger, or a joystick on a gaming peripheral.

13. A haptic feedback interface system configured to provide haptic effects to a user operating the system, the system comprising:
   a computer comprising a processor;
   a display configured to display images output from the computer; and
   a user input element configured to manipulate an object displayed on the display or an object to be displayed on the display, the user input element comprising
      a first part comprising a first electrode defining a first capacitive surface,
      a second part comprising a second electrode defining a second capacitive surface configured to be movable relative to the first capacitive surface, the second part in contact with the first part at an interface, and
      an insulator positioned in between the first capacitive surface and the second capacitive surface so that an electrostatic haptic effect is generated when the second capacitive surface is moved relative to the first capacitive surface from a first position to a second position,
   wherein a voltage difference is applied to the first electrode and the second electrode by a voltage generator to generate the first capacitive surface and the second capacitive surface and to change a friction force between the first part and the second part at the interface and generate the electrostatic haptic effect.

14. The system of claim 13, further comprising a resilient element configured to bias the second capacitive surface in the first position.

15. The system of claim 13, wherein the first part comprises a plurality of first electrodes defining the first capacitive surface and the second part comprises a plurality of second electrodes defining the second capacitive surface.

16. The system of claim 15, wherein the electrostatic haptic effect is generated when the voltage difference is applied to the plurality of first electrodes and the plurality of second electrodes by the voltage generator.

17. The system of claim 13, further comprising a keyboard operatively connected to the computer, wherein the user input element is a key of the keyboard.

18. The system of claim 13, further comprising a user input device operatively connected to the computer, wherein the user input element is a button of the user input device.

19. The system of claim 18, wherein the user input device is a computer mouse.

20. The system of claim 13, wherein the system is a gaming system and the user input element is a joystick operatively connected to the computer.

21. The system of claim 13, further comprising a gaming peripheral operatively connected to the computer, wherein the user input element is a button, a trigger, or a joystick on the gaming peripheral.

* * * * *